United States Patent
Mullett (10) Patent No.: US 10,131,300 B2
(45) Date of Patent: Nov. 20, 2018

(54) WIRELESS HVAC AND INFOTAINMENT SYSTEM CONTROL FOR AUTONOMOUS VEHICLES

(71) Applicant: DENSO International America, Inc., Southfield, MI (US)

(72) Inventor: Reilly Patrick Mullett, Livonia, MI (US)

(73) Assignee: DENSO International America, Inc., Southfield, MI (US)

(*) Notice: Subject to any disclaimer, the term of this patent is extended or adjusted under 35 U.S.C. 154(b) by 156 days.

(21) Appl. No.: 15/254,625

(22) Filed: Sep. 1, 2016

(65) Prior Publication Data

US 2018/0056903 A1    Mar. 1, 2018

(51) Int. Cl.
| | | |
|---|---|---|
| *B60R 16/03* | (2006.01) | |
| *E05F 15/77* | (2015.01) | |
| *B60R 16/037* | (2006.01) | |

(52) U.S. Cl.
CPC ............ *B60R 16/037* (2013.01); *E05F 15/77* (2015.01)

(58) Field of Classification Search
CPC ................ B60R 16/037; E05F 15/77
See application file for complete search history.

(56) References Cited

U.S. PATENT DOCUMENTS

| | | |
|---|---|---|
| 7,092,794 B1 | 8/2006 | Hill et al. |
| 9,701,265 B2 * | 7/2017 | Breed .................... B60R 16/037 |
| 2013/0103779 A1 * | 4/2013 | Bai ....................... H04L 67/2833 709/213 |
| 2013/0332007 A1 | 12/2013 | Louboutin |
| 2014/0045482 A1 | 2/2014 | Bisson et al. |
| 2017/0285642 A1 * | 10/2017 | Rander .................... G05D 1/021 |
| 2017/0327082 A1 * | 11/2017 | Kamhi ............... B60H 1/00735 |

* cited by examiner

*Primary Examiner* — Thomas Ingram
(74) *Attorney, Agent, or Firm* — Harness, Dickey & Pierce, P.L.C.

(57) ABSTRACT

A system and method are provided and include a controller that controls at least one of an HVAC system and a window actuator system of an autonomous vehicle. The controller is in communication with a server and is configured to receive a request for transportation from a smartphone in communication with the server. The request for transportation includes a pickup location. The controller is configured to receive a command from the smartphone through communication with the server and to control at least one of the HVAC system and the window actuator system based on the received command prior to arrival of the autonomous vehicle at the pickup location.

14 Claims, 5 Drawing Sheets

WIRELESS HVAC AND INFOTAINMENT SYSTEM CONTROL FOR AUTONOMOUS VEHICLES

FIELD

The present disclosure relates to wireless HVAC and infotainment system control for autonomous vehicles and, in particular, to systems and methods for wireless HVAC and infotainment control for autonomous vehicles using a computing device, such as a smartphone.

BACKGROUND

This section provides background information related to the present disclosure, which is not necessarily prior art.

Systems exist for autonomous or self-driving vehicles, which can be used as a form of public or shared transportation. For example, a passenger may be able to use a computing device, such as a smartphone, to request that an autonomous or self-driving vehicle pick up the passenger at a designated location and transport the passenger to a designated destination. When picking up the passenger, however, the HVAC and infotainment systems may be set to default settings or to settings that were previously set by a previous passenger instead of to settings based on the preferences of the current passenger.

SUMMARY

This section provides a general summary of the disclosure, and is not a comprehensive disclosure of its full scope or all of its features.

The present teachings include systems and methods for wireless HVAC and infotainment system control in an autonomous vehicle.

The present teachings include a system comprising a controller that controls at least one of an HVAC system and a window actuator system of an autonomous vehicle. The controller is in communication with a server and configured to receive a request for transportation from a smartphone in communication with the server. The request for transportation includes a pickup location. The controller is configured to receive a command from the smartphone through communication with the server and to control at least one of the HVAC system and the window actuator system based on the received command prior to arrival of the autonomous vehicle at the pickup location.

The present teachings also include a method. The method includes receiving, with a controller of an autonomous vehicle, a request for transportation from a smartphone, the request for transportation including a pickup location and the controller and the smartphone each being in communication with a server. The method also includes receiving, with the controller, a command from the smartphone through communication with the server. The method also includes controlling, with the controller, at least one of an HVAC system and a window actuator system of the autonomous vehicle based on the received command prior to arrival of the autonomous vehicle at the pickup location.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present teachings include a system for controlling a heating, ventilation, and air conditioning (HVAC) system and/or an infotainment system of an autonomous vehicle. For example, the present teachings include using a smartphone application to control an HVAC system and/or an infotainment system of an autonomous or self-driving vehicle while a passenger is waiting for the autonomous vehicle to arrive for pickup and while the passenger is being transported in the autonomous vehicle to a designated destination.

Figure 1:
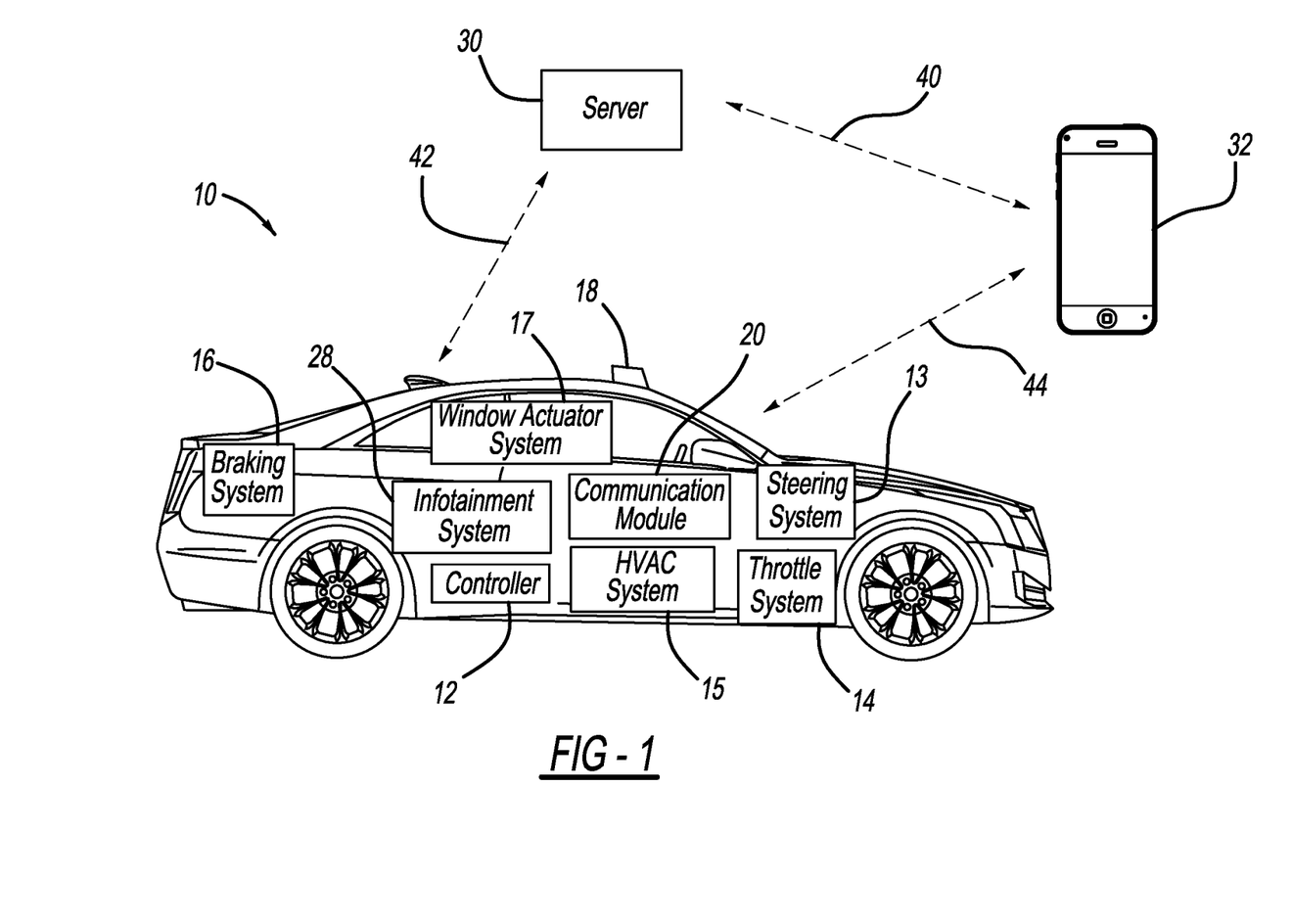
FIG. 1 illustrates an autonomous vehicle according to the present teachings.

With reference to FIG. 1, an autonomous vehicle 10 is illustrated and includes a controller 12, a steering system 13, a throttle system 14, an HVAC system 15, a braking system 16, a window actuator system 17, a communication module 20, and an infotainment system 28.

The autonomous vehicle 10 also includes one or more environmental sensors 18 to sense information about the surroundings of the autonomous vehicle 10. For example, the environmental sensors 18 may include an image sensor, such as a camera, mounted to a roof, a windshield, and/or other locations of the autonomous vehicle 10. Additionally, the environmental sensors 18 may include a Lidar sensor, a radar sensor, an ultrasonic sensor, or other sensors for detecting information about the surroundings of the autonomous vehicle 10, including, for example, other vehicles, lane lines, guard rails, objects in the roadway, buildings, pedestrians, etc., While the environmental sensors 18 are shown in FIG. 1 as a single entity, additional environmental sensors may be located on or around the autonomous vehicle 10. For example, the autonomous vehicle 10 may include a rear-facing sensor for sensing objects behind the autonomous vehicle 10. The autonomous vehicle 10 may also include a global positioning system (GPS) and corresponding GPS sensors.

The controller 12 receives data about the surroundings of the autonomous vehicle 10 from the environmental sensors 18 and uses the received data for driving the autonomous vehicle 10. For example, the controller 12 uses the received data to control the steering system 13, the throttle system 14, and the braking system 16 to drive the vehicle to a particular location. For example, the location may be a pickup location to pick up a passenger that has requested transportation via the autonomous vehicle 10 through a smartphone 32 running a smartphone application that communicates with a server 30 that, in turn, communicates with the controller 12 of the autonomous vehicle 10 using the communication module 20.

As shown in FIG. 1, line 40 illustrates a wireless communication link between the smartphone 32 and the server 30 while line 42 illustrates a wireless communication link between the server 30 and the controller 12 of the autonomous vehicle 10. As mentioned above, the server 30 communicates with the controller 12 through the communication module 20. The smartphone 32 may communicate with the server 30 over the Internet using a WiFi network or a cellular data network, such as an LTE, 4G, or 3G network. Similarly, the server 30 may communicate with the communication module 20 of the autonomous vehicle 10 over the Internet using a WiFi network or a cellular data network, such as an LTE, 4G, or 3G network. Additionally or alternatively, the server 30 may communicate with the communication module 20 of the autonomous vehicle 10 using a satellite communication link or any other suitable communication link.

A passenger may use the smartphone 32 and a smartphone application running on the smartphone to request transportation via the autonomous vehicle 10. For example, the passenger may input, using the smartphone application, a particular destination that the passenger would like to be transported to. While a smartphone 32 is shown and discussed, other computing devices, such as a tablet, laptop, or other computing device, could also be used. Once the passenger has inputted the particular destination, the smartphone application running on the smartphone 32 communicates the request for transportation, including the inputted destination and the current location of the passenger, to the server 30. The smartphone application may determine the current location of the passenger using a GPS service of the smartphone 32. The current location of the passenger, for example, is communicated to the server 30 as a pickup location for the passenger. Alternatively, the passenger may input a particular pickup location that the passenger will be at for pickup.

The server 30 receives the request for transportation from the smartphone application running on the smartphone 32 and communicates the pickup location and the particular destination to the autonomous vehicle 10. The controller 12 receives the pickup location and particular destination from the server 30 through the communication module 20 and controls the steering system 13, the throttle system 14, and the braking system 16 to drive the autonomous vehicle 10 to the pickup location to pick up the passenger. Once the autonomous vehicle 10 has arrived at the pickup location, the controller 12 may open or unlock the doors of the autonomous vehicle 10 so that the passenger can enter the autonomous vehicle 10.

The autonomous vehicle 10 may include one or more passenger detection sensors to detect whether passengers are present in the autonomous vehicle 10. In this way, the controller 12 can determine, based on the data from the one or more passenger detection sensors that passenger(s) have entered the vehicle. Additionally or alternatively, the controller 12 can determine that passenger(s) have entered the vehicle based on the vehicle request control logic. For example, the controller 12 can determine that passenger(s) have entered the autonomous vehicle 10 once the autonomous vehicle 10 has arrived at the pickup location and the doors of the autonomous vehicle 10 have been opened and closed.

Once the autonomous vehicle 10 is in the vicinity of the smartphone, such as when the autonomous vehicle 10 is approaching the pickup location and/or when the passenger with the smartphone 32 has entered the autonomous vehicle 10, the smartphone 32 may communicate directly with the autonomous vehicle 10 using a direct communication link from the smartphone 32 to the controller 12 through the communication module 20. In FIG. 1, line 44 illustrates a wireless communication link between the smartphone 32 and the controller 12 of the autonomous vehicle 10. For example, the smartphone 32 may communicate directly with the communication module 20 using a wireless personal area network (WPAN). For example, the WPAN connection may be a BLUETOOTH® or other suitable WPAN connection. When the controller 12 and/or the smartphone 32 detect that the smartphone 32 is within a suitable range for communication over a WPAN connection, the controller 12, the smartphone 32, and the server 30 may coordinate a handoff of communication such that communication transfers from the communication links through the server 30 (shown in FIG. 1 as lines 40 and 42) to the direct communication link between the autonomous vehicle 10 and the smartphone 32 (shown in FIG. 1 as line 44).

Figure 2A:
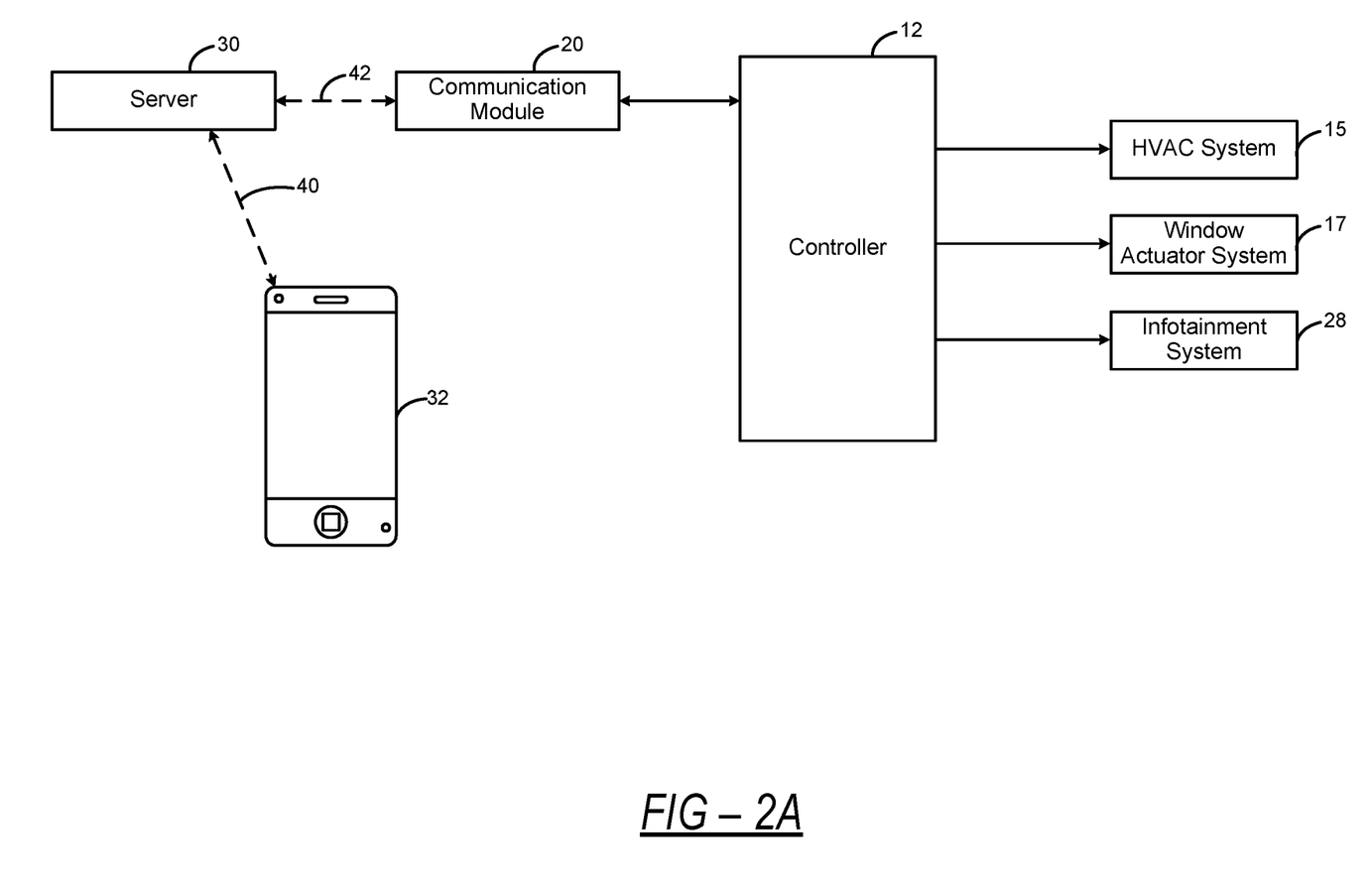
FIGS. 2A and 2B illustrate a block diagram of a wireless HVAC and infotainment control system for an autonomous vehicle according to the present teachings.
Figure 2B:
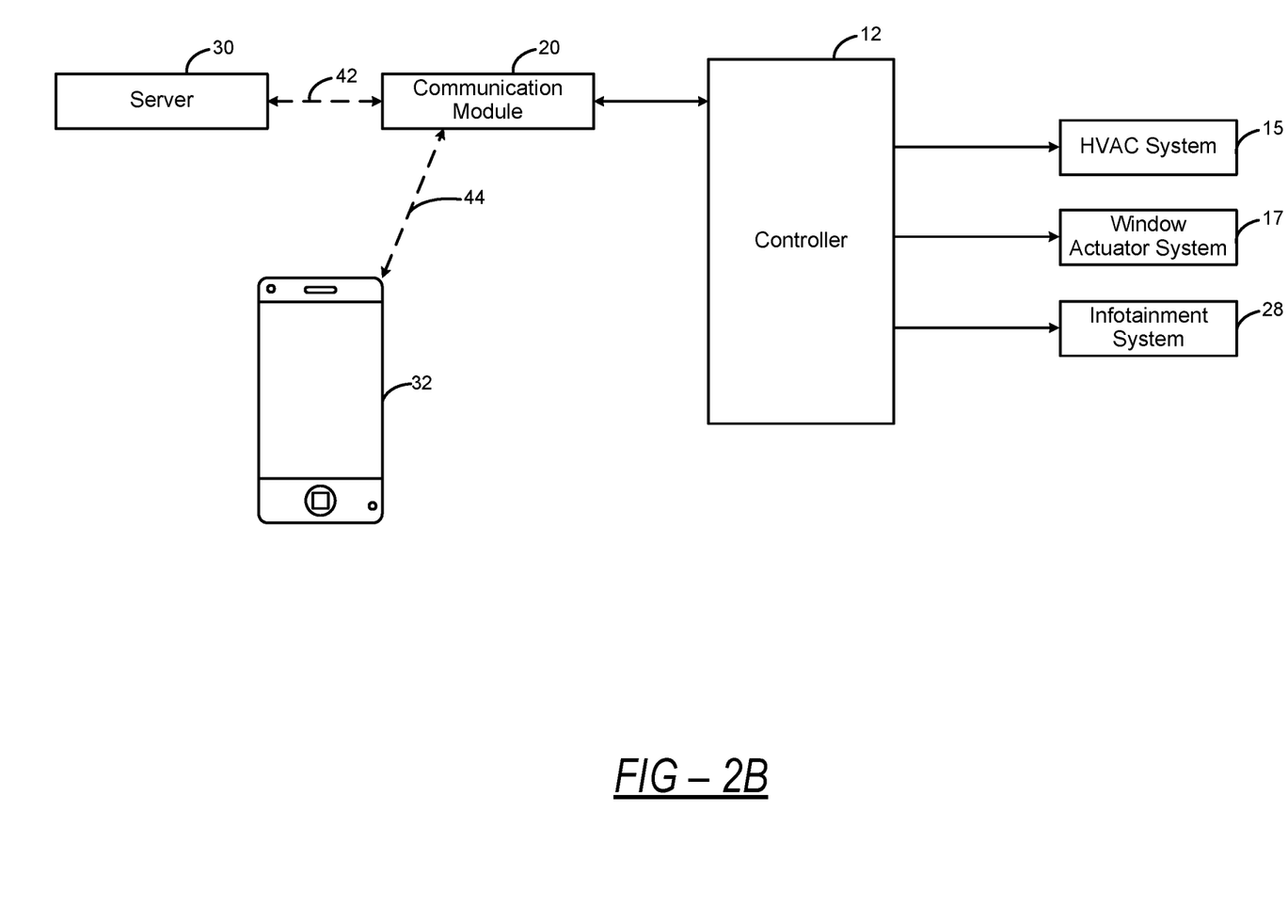

With reference to FIGS. 2A and 2B, communication between the smartphone 32, the server 30, and the communication module 20 are shown both before and after the communication handoff. For example, in FIG. 2A before the communication handoff, the smartphone 32 is shown communicating with the server over the communication link shown by line 40. The server 30, in turn, communicates with the communication module 20 over the communication link shown by line 42. The controller 12 communicates with the communication module 20. As shown in FIG. 2A, the controller 12 also generates outputs to control the HVAC system 15, the window actuator system 17, and the infotainment system 28 of the autonomous vehicle 10, as discussed in further detail below. With reference to FIG. 2B, after the communication handoff, the smartphone 32 communicates directly with the communication module 20 over the communication link shown by line 44.

Once the passenger has requested transportation via the autonomous vehicle 10 using the smartphone application running on the smartphone 32, the passenger may then use the smartphone application to input a requested temperature for the autonomous vehicle. Additionally, the passenger may also use the smartphone application to input preferences for the infotainment system 28. The infotainment system 28 may include, for example, a satellite radio system, an FM radio, an AM radio, and other systems for providing audio and/or visual output to the passenger while being transported in the autonomous vehicle 10. The infotainment system 28 may also include an option for playing audio or visual content through the smartphone 32 itself. For example, the smartphone 32 can communicate audio or visual content to the controller 12 that is then outputted in the autonomous vehicle 10 using audio speakers and/or a display device, such as a video screen, of the autonomous vehicle. The passenger may use the smartphone application to input that the infotainment system 28 be set to a particular satellite radio station, a particular FM radio station, a particular AM radio station, or that the infotainment system 28 play audio or visual content from the smartphone 32.

In the systems and methods according to the present teachings, the passenger can use the smartphone application running on the smartphone 32 to input, for example, a requested temperature for the autonomous vehicle and/or preferences for the infotainment system while waiting for the autonomous vehicle 10 to arrive at the pickup location. For example, the passenger can submit a requested temperature for the autonomous vehicle 10 to be at when the autonomous vehicle 10 arrives at the pickup location. The autonomous vehicle 10 includes in-cabin environmental sensors for detecting a temperature and a humidity level in the cabin of the autonomous vehicle 10. Additional in-cabin environmental sensors may also be used for detecting environmental conditions within the cabin of the autonomous vehicle 10. The controller 12 monitors data from the in-cabin environmental sensors, including the temperature and humidity level within the cabin of the autonomous vehicle 10. The controller 12 also determines an estimated travel time from the current location of the autonomous vehicle 10 to the pickup location and can control the HVAC system 15 and or the window actuator system 17 to achieve the requested temperature within the cabin of the autonomous vehicle 10 within the estimated travel time to the pickup location. For example, if there is a large difference between the current temperature within the autonomous vehicle 10 and the requested target temperature and/or if the estimated travel time to the pickup location is short, the controller 12 can operate the HVAC system 15 at a maximum level to achieve the requested target temperature. For further example, if the difference between the current temperature within the autonomous vehicle 10 and the requested target temperature is small and/or the estimated travel time to the pickup location is long, the controller 12 can operate the HVAC system 15 at a lower level to achieve the requested target temperature. For further example, if the requested target temperature is close to an outdoor ambient temperature, the controller 12 can open one or more windows of the autonomous vehicle 10 to allow outdoor air to flow into the autonomous vehicle 10 to achieve the requested target temperature. Additionally or alternatively, the passenger may use the smartphone application to request that the windows of the autonomous vehicle 10 be opened without inputting a requested target temperature. In such case, the controller 12 can open the windows using the window actuator system 17.

The controller 12 can be programmed with information regarding the rate at which the HVAC system 15 can increase or decrease the temperature within the autonomous vehicle 10 at various HVAC system levels of operation and at various outdoor ambient temperatures. As such, the controller 12 can determine the appropriate HVAC system level of operation to achieve the requested target temperature within the estimated travel time to the pickup location so that the interior of the autonomous vehicle 10 is at the requested target temperature when the autonomous vehicle 10 arrives at the pickup location.

In addition, the passenger may use the smartphone application to input that the infotainment system 28 be set to a particular satellite radio station, a particular FM radio station, a particular AM radio station, or that the infotainment system 28 play particular audio or visual content from the smartphone 32 upon arrival at the pickup location. For example, the passenger may use the smartphone application to request that a particular song or video on the smartphone be playing on the infotainment system 28 when the autonomous vehicle 10 arrives at the pickup location. The particular song or video, for example, can be stored on the smartphone 32 or can be available through an audio or video streaming application running on the smartphone 32. For example, the audio or video streaming application may retrieve and output audio or video content by accessing a server over the internet via a WiFi or a cellular data connection, such as LTE, 4G, or 3G. For further example, the smartphone 32 could communicate the particular audio or visual content to the autonomous vehicle 10 through communication with the server 30. In this way, the controller 12 can load the particular audio or visual content into the infotainment system 28 prior to arriving at the pickup location and can begin to play the particular audio or visual content on the infotainment system 28 when the autonomous vehicle 10 arrives at the pickup location. Additionally or alternatively, the controller 12 can control the infotainment system 28 to play the particular audio or visual content from the smartphone 32 once the smartphone 32 is communicating via a direct communication link, shown as line 44 in FIGS. 1 and 2B. Additionally, as discussed above, the passenger can use the smartphone application running on the smartphone 32 to request that a particular satellite radio station, a particular FM radio station, or a particular AM radio station be playing on the infotainment system 28 of the autonomous vehicle 10 when the autonomous vehicle 10 arrives at the pickup location.

Once the passenger has been picked up at the pickup location by the autonomous vehicle, the passenger can continue to use the smartphone application running on the smartphone to control the HVAC system 15 and the infotainment system 28 of the autonomous vehicle 10. Once the passenger is dropped off at the designated destination location, the autonomous vehicle 10 disconnects from the smartphone application running on the smartphone 32. As such, the passenger cannot control the HVAC system 15 or the infotainment system 28 once the passenger is dropped off from the autonomous vehicle 10. Further, once the passenger is dropped off, the controller 12 returns the HVAC system 15 and the infotainment system 28 to predetermined default passengerless settings. For example, the predetermined default passengerless settings may include a default target temperature, such as 72° Fahrenheit for the HVAC system 15. Further, the predetermined default passengerless settings may include putting the infotainment system 28 into a standby, hibernation, or off mode.

Figure 3:
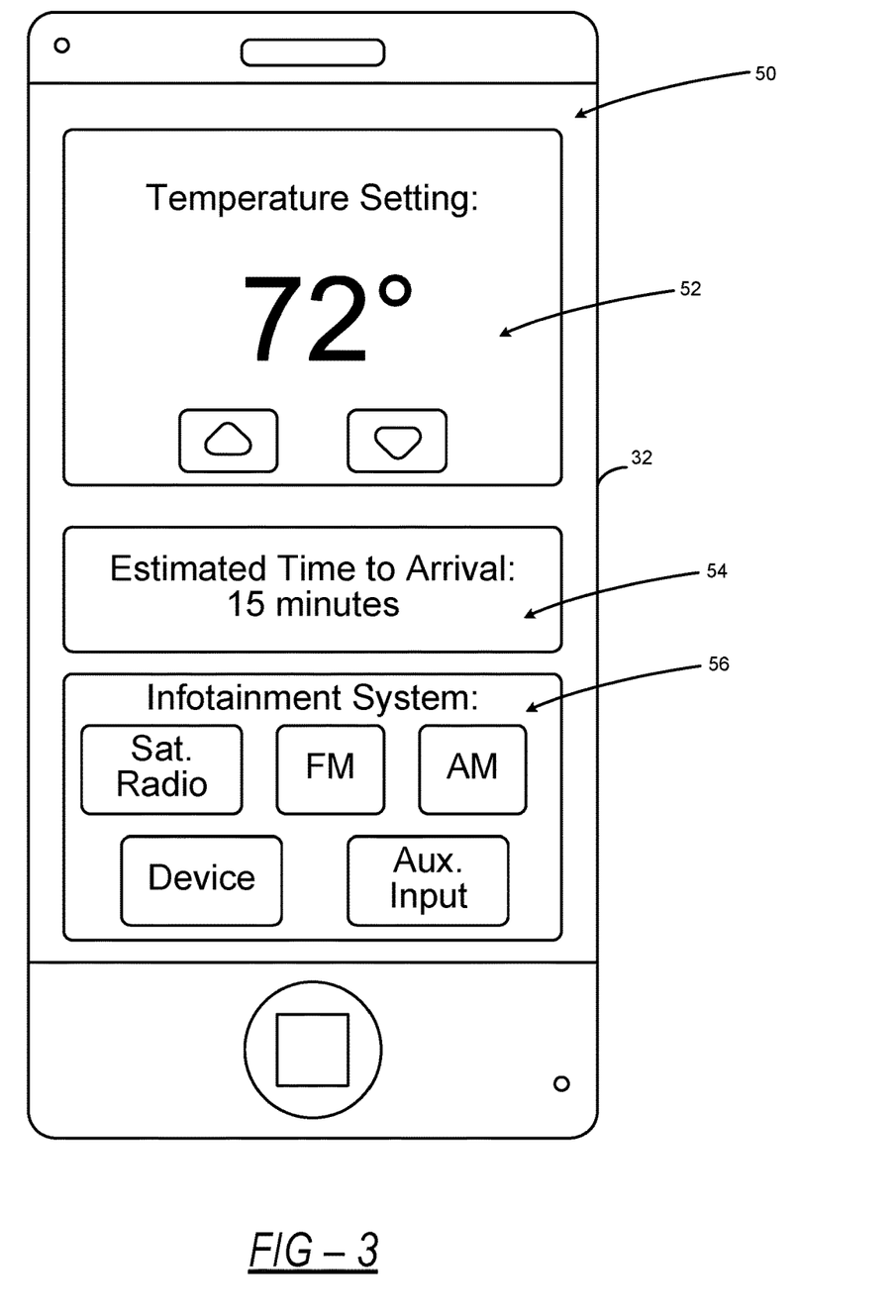
FIG. 3 illustrates a user interface for a smartphone application according to the present teachings.

With reference to FIG. 3, a user interface 50 for the smartphone application running on the smartphone 32 is illustrated. For example, the user interface 50 includes an HVAC related section 52 that shows the currently requested temperature setting for the autonomous vehicle 10. As shown in FIG. 3, the currently requested temperature setting is provided as 72° Fahrenheit. The HVAC related section 52 includes arrows for increasing or decreasing the requested temperature setting. Additionally, although not shown in FIG. 3, the user interface 50 can include input options for opening the windows of the autonomous vehicle or operating vents of the HVAC system 15 to allow outside air to flow into the autonomous vehicle.

The user interface 50 also includes a time to arrival section 54 that displays a currently estimated time until the autonomous vehicle 10 arrives at the passenger's pickup location.

The user interface 50 also includes an infotainment system section 56 that provides display buttons for selecting, for example, satellite radio, FM radio, AM radio, a device, or an auxiliary input. The device may correspond to the smartphone or computing device that is running the smartphone application. The auxiliary input may correspond to receiving audio or visual content through an auxiliary connection cable in the autonomous vehicle 10. In addition, although not shown in FIG. 3, the infotainment system section 56 can include additional display buttons for inputting or selecting a particular satellite radio station, a particular FM radio station, or a particular AM radio station. The infotainment system section 56 can also include additional display buttons for adjusting volume or equalization levels of the audio output of the infotainment section.

Figure 4:
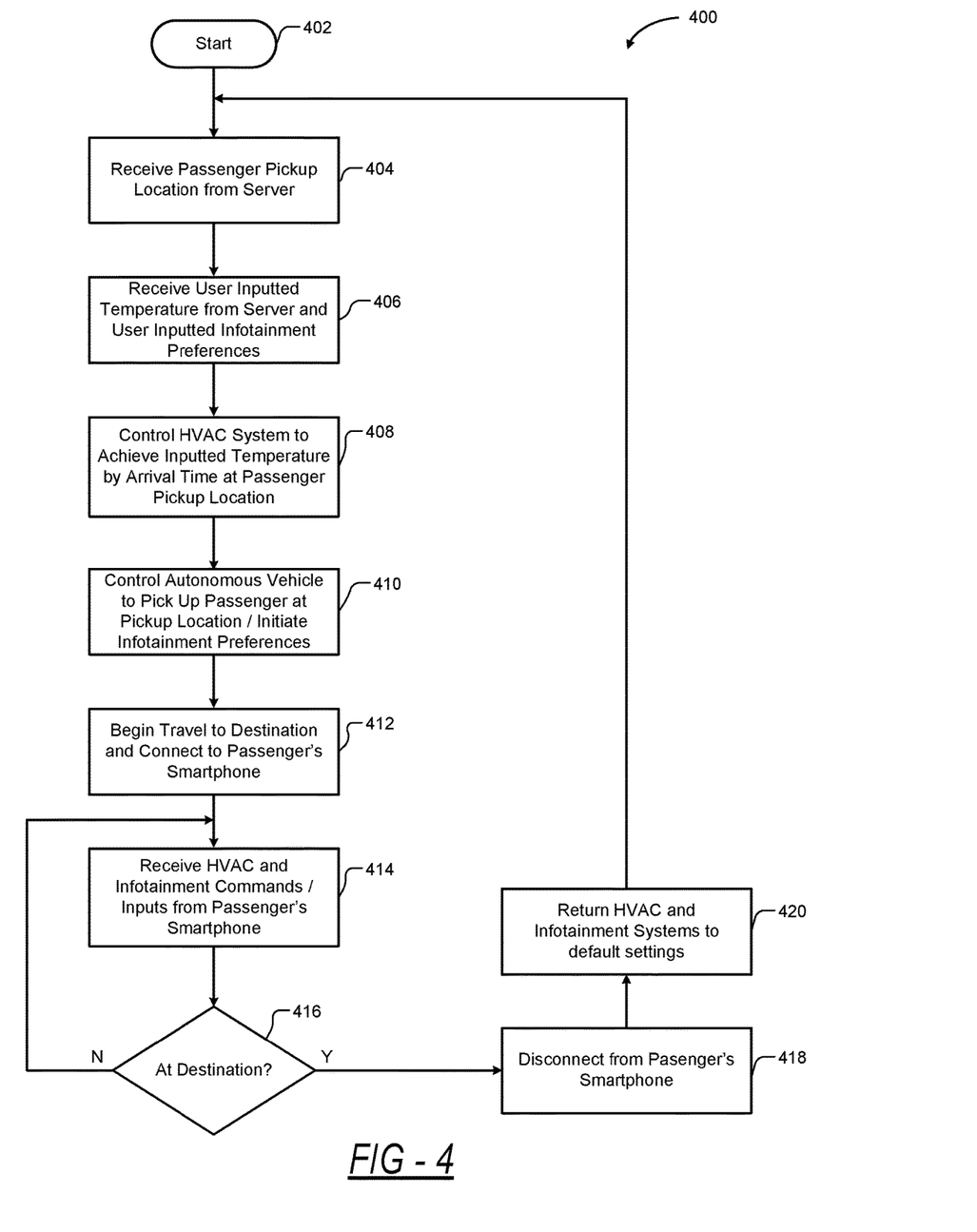
FIG. 4 illustrates a method for controlling HVAC and infotainment systems of an autonomous vehicle according to the present teachings.

With reference to FIG. 4, a flow diagram of a method 400 for HVAC and infotainment system control for autonomous vehicles according to the present teachings is illustrated. The method 400 can be performed by the controller 12 of the autonomous vehicle 10 and begins at 402. At 404, the controller 12 receives a request for passenger pickup at a particular passenger pickup location from the server 30. The request may also include a designated destination, as inputted by the passenger.

At 406, controller 12 receives a user inputted temperature setting from the server 30. As mentioned above, the user can input the temperature setting using the smartphone application running on the smartphone 32 and the smartphone application can communicate the temperature setting to the server 30. Similarly, at 406, the controller 12 also receives user inputted infotainment preferences. As mentioned above, the user can input the passenger's infotainment preferences using the smartphone application running on the smartphone 32 and the smartphone application can communicate the infotainment preferences to the server 30.

At 408, the controller 12 controls the HVAC system to achieve the inputted temperature within an estimated arrival time at the passenger's pickup location. For example, the controller 12 can determine an estimated arrival time based on the estimated time of travel from the current location of the autonomous vehicle to the passenger's pickup location. For example, as discussed above, the controller 12 can be programmed with information regarding the rate at which the HVAC system 15 can increase or decrease the temperature within the autonomous vehicle 10 at various HVAC system levels of operation and at various outdoor ambient temperatures. As such, the controller 12 can determine the appropriate HVAC system level of operation to achieve the requested target temperature within the estimated travel time to the pickup location so that the interior of the autonomous vehicle 10 is at the requested target temperature when the autonomous vehicle 10 arrives at the pickup location.

At 410, once the autonomous vehicle 10 arrives at the pickup location, the controller 12 controls the autonomous vehicle to pick up the passenger at the pickup location. For example, the controller 12 may open or unlock one or more doors of the autonomous vehicle 10. The autonomous vehicle 10 may include one or more passenger detection sensors to detect whether passengers are present in the autonomous vehicle 10. In this way, the controller 12 can determine, based on the data from the one or more passenger detection sensors that passenger(s) have entered the vehicle. Additionally or alternatively, the controller 12 can determine that passenger(s) have entered the vehicle based on the vehicle request control logic. For example, the controller 12 can determine that passenger(s) have entered the autonomous vehicle 10 once the autonomous vehicle 10 has arrived at the pickup location and the doors of the autonomous vehicle 10 have been opened and closed.

Additionally, at 410 the controller 12 can control the infotainment system 28 to initiate the passenger's inputted infotainment preferences as the autonomous vehicle is arriving at the pickup location. For example, the controller 12 can control the infotainment system 28 to play a particular satellite radio station, a particular FM or AM radio station, or particular audio or visual content from the smartphone 32, such as audio or visual content from a streaming service or audio or visual content stored on the smartphone 32, as discussed above.

At 412, once the passenger is in the autonomous vehicle 10, the controller 12 controls the autonomous vehicle 10 to begin travel to the destination. In addition, at 412 the controller 12 establishes a direct communication link to the passenger's smartphone 32 using the communication module 20. As discussed above, the direct communication link (as shown by line 44 in FIGS. 1 and 2B) can be a WPAN connection, such as a BLUETOOTH® or other suitable WPAN connection. Alternatively, the smartphone 32 can continue to communicate with the autonomous vehicle 10 through the server 30.

At 414, while traveling to the passenger's designated destination, the controller 12 can receive additional commands for adjustment of settings of the HVAC system 15 and the infotainment system 28 from the passenger's smartphone 32. In this way, it is not necessary for the autonomous vehicle 10 to have a separate interface for controlling the HVAC system 15 or the infotainment system 28. In other words, all control of the HVAC system 15 and the infotainment system 28 can be performed by the passenger through the passenger's smartphone 32 and the smartphone application running on the smartphone 32.

At 416, the controller 12 determines whether the autonomous vehicle 10 has arrived at the passenger's designated destination. At 416, when the autonomous vehicle has not arrived at the passenger's designated destination, the controller 12 loops back to 414 and continues to receive any commands for adjusting settings of the HVAC system 15 and/or the infotainment system 28. At 416, when the autonomous vehicle 10 has arrived at the passenger's designated destination, the controller 12 proceeds to 418.

At 418, the controller 12 disconnects the communication link with the passenger's smartphone 32. In this way, once the autonomous vehicle 10 has arrived at the designated destination and the passenger has exited the vehicle, the passenger's smartphone 32 is disconnected from the autonomous vehicle 10 and can no longer change the settings of the HVAC system 15 or the infotainment system 28 of the autonomous vehicle 10.

At 420, the controller 12 returns the HVAC system 15 and the infotainment system 28 to their respective default settings. The controller 12 then proceeds to 404 to receive the next passenger pickup location from the server 30.

In this application, including the definitions below, the terms "module," "controller," control module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules, controllers, control modules, and systems described herein. In addition, in this application the terms "module," "controller," or "control module" may be replaced with the term "circuit."

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
    a controller that controls at least one of an HVAC system and a window actuator system of an autonomous vehicle, the controller being in communication with a server and configured to receive a request for transportation from a smartphone in communication with the server, the request for transportation including a pickup location,
    wherein the controller is configured to receive a command from the smartphone through communication with the server and to control at least one of the HVAC system and the window actuator system based on the received command prior to arrival of the autonomous vehicle at the pickup location, and
    wherein the controller is configured to control at least one of a level of operation of the HVAC system and an amount of opening of at least one window of the autonomous vehicle based on an estimated time until arrival of the autonomous vehicle at the pickup location and on a rate at which the HVAC system can increase or decrease a temperature within the autonomous vehicle.

2. The system of claim 1, wherein the command includes a requested target temperature and wherein the controller controls at least one of the HVAC system and the window actuator system such that an interior temperature of the autonomous vehicle matches the requested target temperature when the autonomous vehicle arrives at the pickup location.

3. The system of claim 1, wherein the controller is further configured to receive additional commands from the smartphone after picking up at least one passenger at the pickup location and to control at least one of the HVAC system and the window actuator system based on the additional commands after picking up the at least one passenger.

4. The system of claim 1, wherein the controller communicates directly with the smartphone after picking up at least one passenger at the pickup location.

5. The system of claim 1, wherein the controller receives an infotainment preference from the smartphone through communication with the server and controls an infotainment system of the autonomous vehicle based on the received infotainment preference.

6. The system of claim 5, wherein the infotainment preference includes a selection of a system from at least one of a satellite radio, an FM radio, an AM radio, and the smartphone and wherein the controller controls the infotainment system to output audio and/or visual output from the selected system when the autonomous vehicle arrives at the pickup location.

7. The system of claim 5, wherein the controller is further configured to receive infotainment system commands from the smartphone after picking up at least one passenger at the pickup location and to control the infotainment system based on the infotainment system commands while transporting the at least one passenger.

8. A method comprising:
    receiving, with a controller of an autonomous vehicle, a request for transportation from a smartphone, the request for transportation including a pickup location and the controller and the smartphone each being in communication with a server;
    receiving, with the controller, a command from the smartphone through communication with the server; and controlling, with the controller, at least one of an HVAC system and a window actuator system of the autonomous vehicle based on the received command prior to arrival of the autonomous vehicle at the pickup location, including controlling at least one of a level of operation of the HVAC system and an amount of opening of at least one window of the autonomous vehicle based on an estimated time until arrival of the autonomous vehicle at the pickup location and on a rate at which the HVAC system can increase or decrease a temperature within the autonomous vehicle.

9. The method of claim 8, wherein the command includes a requested target temperature and wherein the controller controls at least one of the HVAC system and the window actuator system such that an interior temperature of the autonomous vehicle matches the requested target temperature when the autonomous vehicle arrives at the pickup location.

10. The method of claim 8, further comprising:
receiving, with the controller, additional commands from the smartphone after picking up at least one passenger at the pickup location; and
controlling, with the controller, at least one of the HVAC system and the window actuator system based on the additional commands after picking up the at least one passenger.

11. The method of claim 8, wherein the controller communicates directly with the smartphone after picking up at least one passenger at the pickup location.

12. The method of claim 8, wherein the controller receives an infotainment preference from the smartphone through communication with the server and controls an infotainment system of the autonomous vehicle based on the received infotainment preference.

13. The method of claim 12, wherein the infotainment preference includes a selection of a system from at least one of a satellite radio, an FM radio, an AM radio, and the smartphone and wherein the controller controls the infotainment system to output audio and/or visual output from the selected system when the autonomous vehicle arrives at the pickup location.

14. The method of claim 12, further comprising:
receiving, with the controller, infotainment system commands from the smartphone after picking up at least one passenger at the pickup location; and
controlling, with the controller, the infotainment system based on the infotainment system commands while transporting the at least one passenger.

* * * * *